Aug. 22, 1961 W. LORIMER 2,997,178
WATER FILTER
Filed April 13, 1959 2 Sheets-Sheet 1
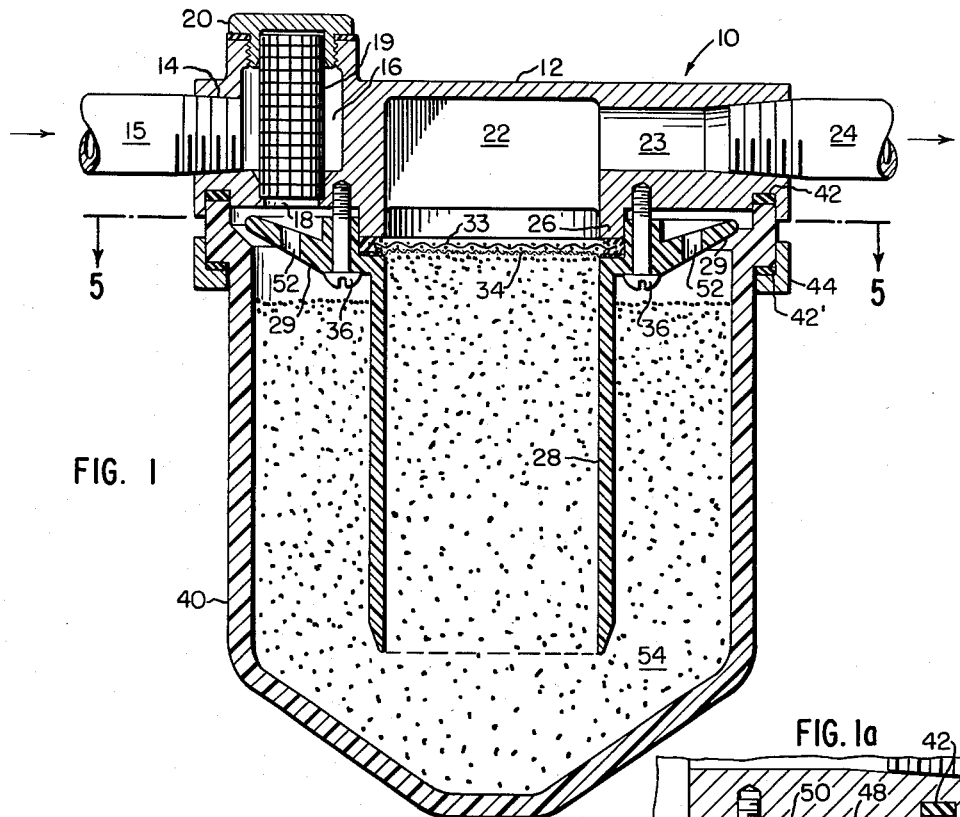
FIG. 1
FIG. 1a
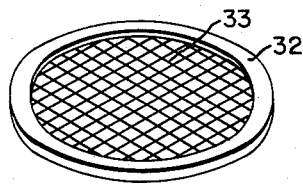
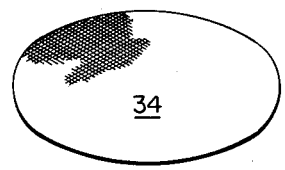
FIG. 2 FIG. 3
INVENTOR.
WILLIAM LORIMER
BY
KENWAY, JENNEY, WITTER & HILDRETH
ATTORNEYS

INVENTOR.
WILLIAM LORIMER
BY
KENWAY, JENNEY, WITTER & HILDRETH
ATTORNEYS

United States Patent Office 2,997,178
Patented Aug. 22, 1961

2,997,178
WATER FILTER
William Lorimer, 319 Hillcrest Road, Needham, Mass.
Filed Apr. 13, 1959, Ser. No. 805,850
2 Claims. (Cl. 210—266)

This invention relates to a novel and efficient water filter constructed to contain a loose body of filtering material, and including means adapted equally to distribute thereover water or other liquid to be filtered, and filter the water a maximum distance through the material by compelling it to pass in both forward and return directions through the filter bed.

The invention more specifically comprises a novel and compact construction embodying a supporting head disposed to be tapped into the pipe carrying the water to be filtered, a primary screen filter for removing any relatively coarse particles from the water, means for supporting a bed of loose filtering material, means for equally distributing the primary filter water over the bed and causing it to pass in forward and return directions through the filtering body to and through a fine filtering screen before releasing the filtered water for consumption. The production of a compact and novel filter of this nature constructed to be conveniently assembled and disassembled for cleaning and changing the filtering material, all as hereinafter more specifically described, comprises the primary object of the invention.

These and other features of the invention hereinafter more specifically described will be best understood and appreciated from the following description of a preferred embodiment thereof selected for purposes of illustration and shown in the accompanying drawings in which:

FIG. 1 is a vertical sectional view through a filter embodying the invention,

FIG. 1a is an enlarged fragmentary view of a portion of FIG. 1,

FIG. 2 is a perspective view of a filter supporting gasket employed,

FIG. 3 illustrates a fine filter screen constructed to be supported within the gasket.

Figure 4:
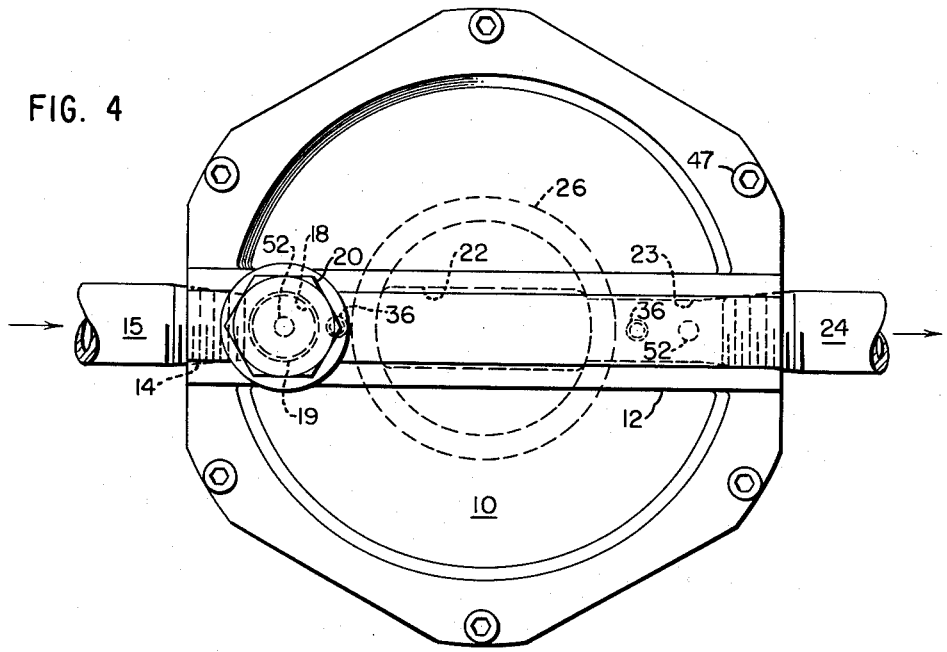
FIG. 4 is a plan view of the filter.
Figure 5:
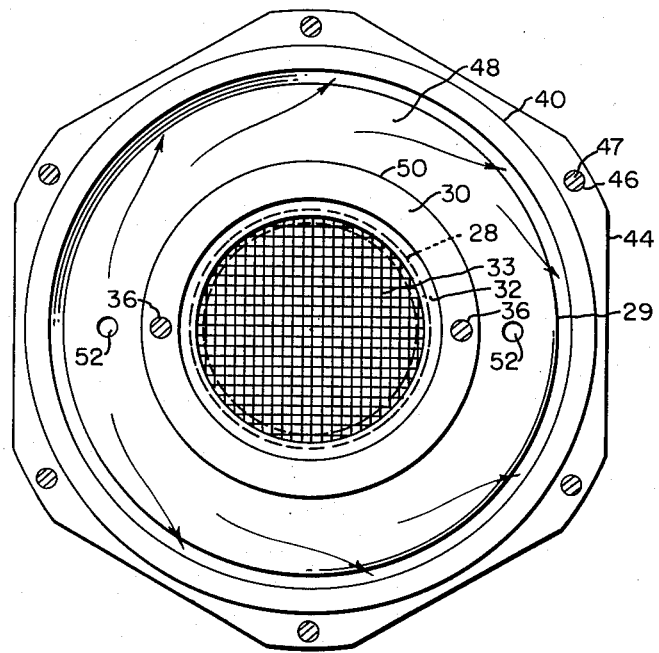
FIG. 5 is a sectional view taken on line 5—5 of FIG. 1.

My filter as illustrated in the drawing comprises a disklike head 10 having a diametrically disposed body 12 integral therewith and extending upwardly therefrom. One end of the body is provided with an opening at 14 to receive a water inlet pipe 15. The opening leads into a chamber 16 having a water outlet opening 18. A tubular filter screen 19 is removably supported in the chamber with its forward end in the opening 18 and its rear end supported within a closure cap 20 in the chamber, the screen being held in spaced relation from the walls of the chamber.

Disposed centrally within the disk 10 and body 12 is a chamber 22 open only at the bottom face of the disk and a water outlet opening 23 from the chamber is provided for receiving a pipe 24. The bottom face of the disk and body are provided with an integral annular flange 26 forming an outwardly facing annular ledge or surface about the margin of the chamber. A tubular deflector 28 has affixed to its top end an annular deflecting flange 29, the flange being provided with an integral annulus 30 disposed to fit about the flange 26 and thus hold the deflector 28 in alignment with the chamber 22. A gasket 32 is provided between the deflector 28 and flange 26 and has incorporated therein a screen 33 for supporting a fine mesh filter 34 beneath and against the screen. Screws 36 extend through the annulus 30 for supporting the flange 29 and deflector 28 on the head and the gasket gripped between the deflector and flange 26.

A cup-like housing or bowl 40 is provided for enclosing the deflector 28 and flange 29 as shown in FIG. 1. The top margin of the cup is disposed to engage a gasket 42 within the body 10 and a ring 44 is threaded at 46 to receive screws 47 for supporting the housing on the body. The top surface 48 of the flange 29 is slightly inclined upwardly-outwardly and cooperating therewith at its inward and lowermost margin is a substantially vertical wall 50 facing outwardly. The surface 48 extends beneath the opening 18 whereby water passing downwardly through the opening strikes the surfaces 48 and 50, flows therefrom around the flange 29 and is deflected outwardly over the margin of the flange whereupon it passes downwardly into the housing 40, the water thus being distributed equally to the filter bed about the cylindrical deflector 28. The flange 29 is also provided with water distributing holes therethrough including a hole 52 beneath the opening 18 to absorb some of the water splash and turbulence and a like hole at the diametrically opposite side of the flange, the two or more holes aiding to equalize the flow and assure a uniform passage of water to the filter bed. The primary filter screen 19 serves to prevent passage of relatively large particles into the filter body and the screen can be conveniently removed and cleaned when necessary. The deflector 28, flange 29 and housing 40 are preferably molded from plastic composition which may be transparent. The filter bed 54 comprises loose filtering material, preferably specially treated carbon particles, within the housing 40. The incoming water first passes through the screen 19 and then downwardly through the opening 18 to the flange 29. The flange together with the wall 50 and holes 52 serve to distribute the water onto the filter bed about the deflector 28, the water thereupon passing downwardly through the bed outside the deflector and then upwardly through the bed within the deflector, thus effecting maximum travel and filtration. Finally the water reaches and passes through the secondary filtering screen 34 which is sufficiently fine to remove all particles larger than 10 microns before the water is released for consumption. The special filter bed preferably employed is adapted to trap any traces of chlorine, objectionable odors, certain types of bacteria and other objectionable elements affecting taste and clarity of water.

Particular attention is called to the relatively large diameter of the cylindrical chamber 22 and to the corresponding inside diameter of the deflector 28 and its straight alignment with the chamber whereby permitting full and free flow of water therethrough. Such construction together with the loose filtering medium provides for full and free flow of water through the filter in such volume as to render it highly efficient and of substantial and continuous capacity.

The compact construction of my filter permits convenient disassembling for cleaning and replacing of the filter bed with new activated carbon. Removal of the screws 47 permits removal of the housing or bowl 40, also the removing of the screws 36 releases the deflector 28 and flange 29 together with the filter screens 32—34. In reassembling the parts the bowl is pushed up about the deflector 28 until it comes into contact with the gasket 42 whereupon it is secured in place by the screws 47 threaded into the ring 44, the ring also being provided with a gasket 42′ like the gasket 42. Especial attention is called to the fact that the loose body of filtering particles permits relatively free flow of water therethrough also each closing off of the outlet flow from the chamber 22 causes the filter bed to rise slightly in the filter bowl whereupon the carbon and filtered out particles at the surface of the body where the water enters at 18 are lifted up and held in suspension, thus breaking up any massing of such particles and facilitating the filtering of the water therethrough.

Having thus disclosed my invention what I claim as new and desire to secure by Letters Patent is:

1. A water filter comprising a head having a cylindrical chamber therein of relatively large diameter, the chamber being open outwardly of the head at one end only and the head having an outwardly facing annular ledge disposed about the margin of said end of the chamber, a tubular deflector entirely open therethrough and having its top end in end to end abutting alignment with said ledge and disposing the interior wall of the deflector substantially in alignment with the interior cylindrical wall of the chamber, the tubular wall of the deflector being substantially impervious to the passage of water therethrough, a filter screen disposed over the top end of the deflector and supported at its margin between said top end and the ledge, a cup-like member removably attached at its open top end to the head and providing a water-impervious housing enclosing and spaced from the tubular deflector, means providing a water inlet passage to a second chamber in the head and an outlet passage therefrom to the interior of the housing outside of the tubular deflector, a loose body of filtering material in said housing and the open bottom end of the tubular deflector extending thereinto, means for receiving water from said outlet passage and distributing it downwardly onto the filtering material within the housing about and outside of the tubular deflector, and means providing a water outlet passage from the first named chamber.

2. The water filter defined in claim 1 in which said means for receiving water from said outlet passage comprises a flange disposed annularly about the tubular deflector in position to receive said water thereonto and distribute it onto the filtering material, said flange being affixed to the top end of the tubular deflector, and co-engaging annular shoulders on the flange and head for locating and holding the tubular deflector in alignment with the first named chamber in the head.

References Cited in the file of this patent

UNITED STATES PATENTS

| | | |
|---|---|---|
| 1,789,961 | Astrom | Jan. 27, 1931 |
| 2,134,413 | Munoz | Oct. 25, 1938 |
| 2,226,045 | Baldwin | Dec. 24, 1940 |
| 2,563,548 | Plante | Aug. 7, 1951 |
| 2,827,270 | Martin | Mar. 18, 1958 |